United States Patent
Brown et al.

[11] Patent Number: 6,006,465
[45] Date of Patent: Dec. 28, 1999

[54] FISHING LURE HARNESS SYSTEM

[75] Inventors: Frank Brown, Mechanicsburg; Richard W. Brown; Richard M. Brown, both of Springfield, all of Ohio

[73] Assignee: Boomerang Marketing, Inc., Springfield, Ohio

[21] Appl. No.: 08/982,565

[22] Filed: Dec. 2, 1997

Related U.S. Application Data

[60] Provisional application No. 60/032,071, Dec. 2, 1996.

[51] Int. Cl.$^6$ ................................................. A01K 85/00
[52] U.S. Cl. .......................................................... 43/42.36
[58] Field of Search ............................... 43/42.22, 42.24, 43/42.35, 42.36, 42.45, 42.23

[56] References Cited

U.S. PATENT DOCUMENTS

| | | | |
|---|---|---|---|
| 2,665,512 | 1/1954 | Sullivan et al. | 43/42.22 |
| 2,682,128 | 6/1954 | Weigandt | 43/42.36 |
| 2,684,551 | 7/1954 | Hall | 43/42.36 |
| 4,589,223 | 5/1986 | Hastings | 43/42.24 |
| 4,642,933 | 2/1987 | Brown | 43/42.36 |
| 4,841,664 | 6/1989 | Baldwin | 43/42.36 |
| 4,887,376 | 12/1989 | Sibley et al. | 43/44.99 |
| 4,941,280 | 7/1990 | Rinaldi | 43/42.36 |
| 5,216,830 | 6/1993 | Brott, II | 43/42.39 |
| 5,233,785 | 8/1993 | Ching | 43/42.36 |
| 5,299,378 | 4/1994 | Ballard | |
| 5,829,183 | 11/1998 | Guerin | 43/42.36 |

*Primary Examiner*—Peter M. Poon
*Assistant Examiner*—Elizabeth Shaw
*Attorney, Agent, or Firm*—Thompson Hine & Flory LLP

[57] ABSTRACT

A soft-bodied crank-bait lure comprising a rigid interior skeleton and a rubbery body molded or formed thereover, where the skeleton includes: a first channel extending downward and rearward from the anterior end of the lure; and a second channel extending downward and forward from the posterior end of the lure. The rearward opening of the first channel is spaced from and substantially faces the forward opening of the second channel, and the first channel and the second channel are angled with respect to each other. Fishing line or leader line is threaded through the first channel and then through second channel, and the hooks are coupled to the line rather than to the skeleton or to the rubbery body. Therefore, the lure will "free-flow" on the line, so that when a fish strikes the lure and becomes hooked, the lure will slide away from the fish. Furthermore, during the ensuing fight, when the line becomes taut, the angled alignment between the first and second channels will cause the lure will become substantially "locked" onto the line away from the fish.

10 Claims, 3 Drawing Sheets

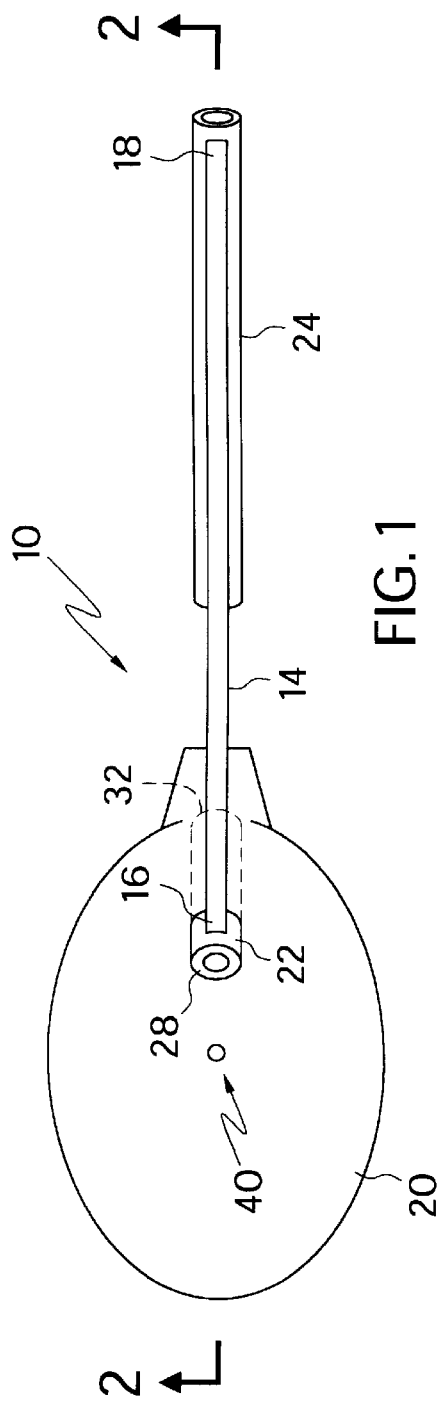
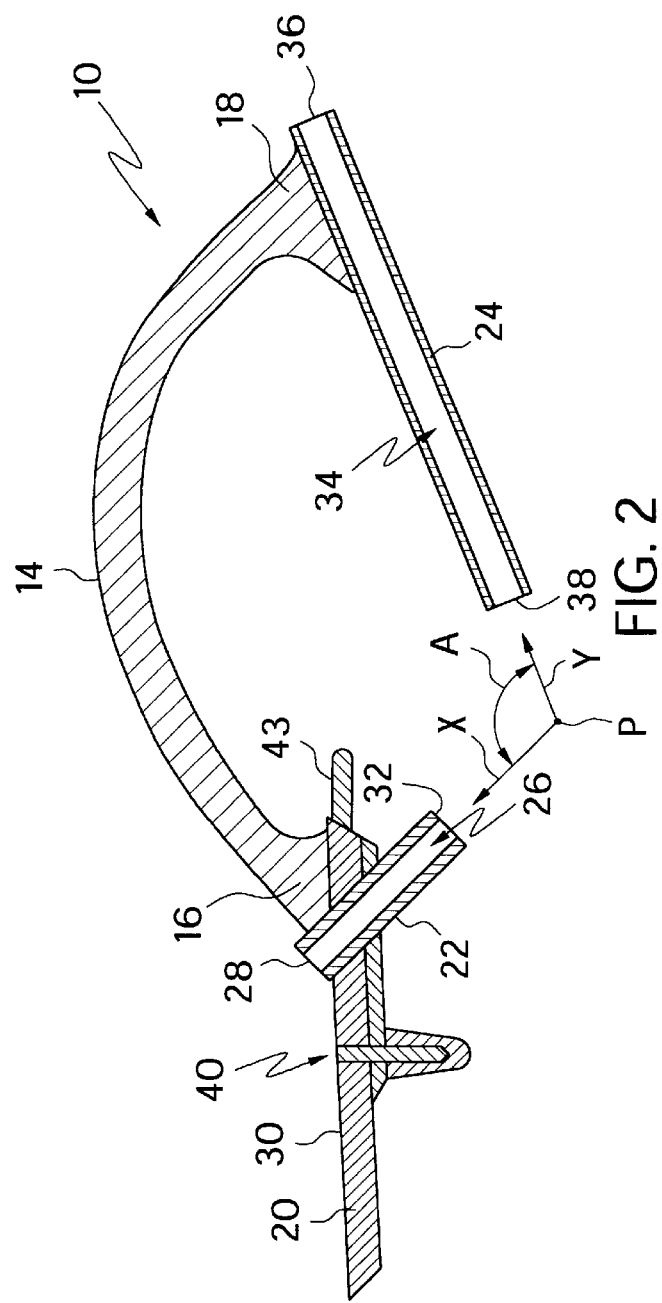

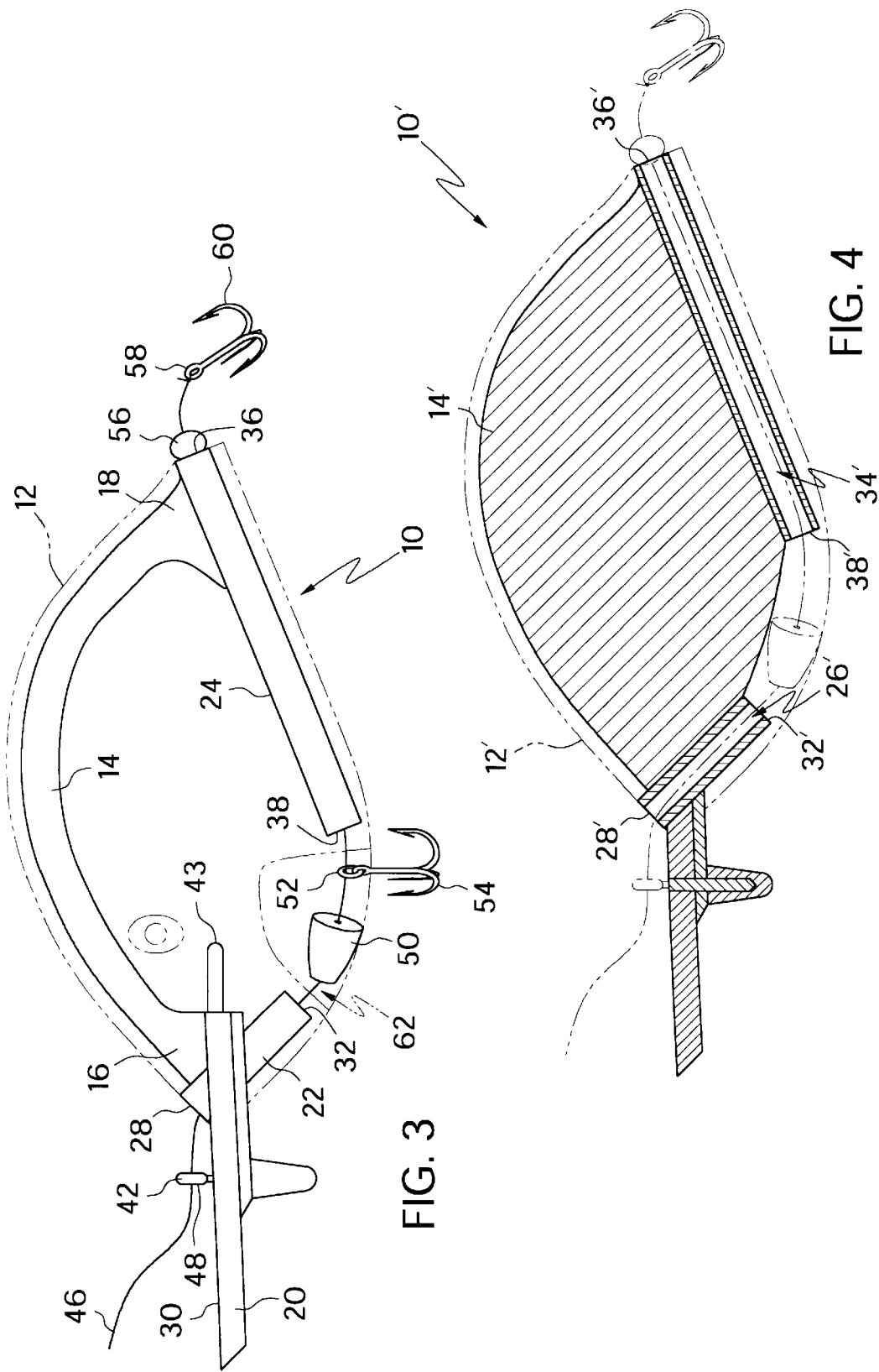

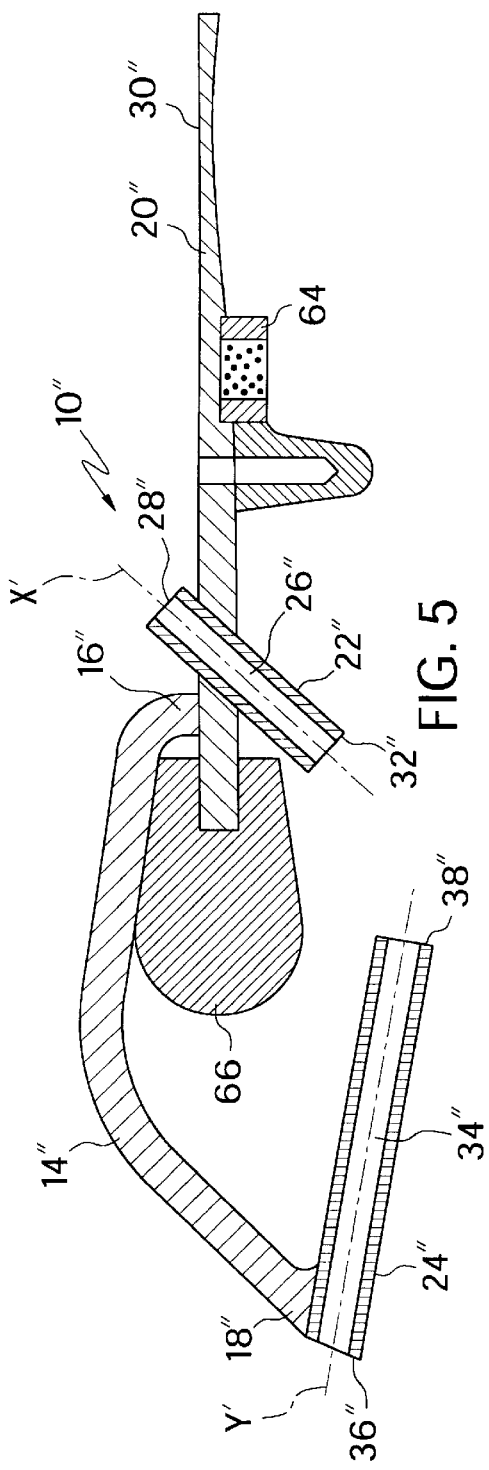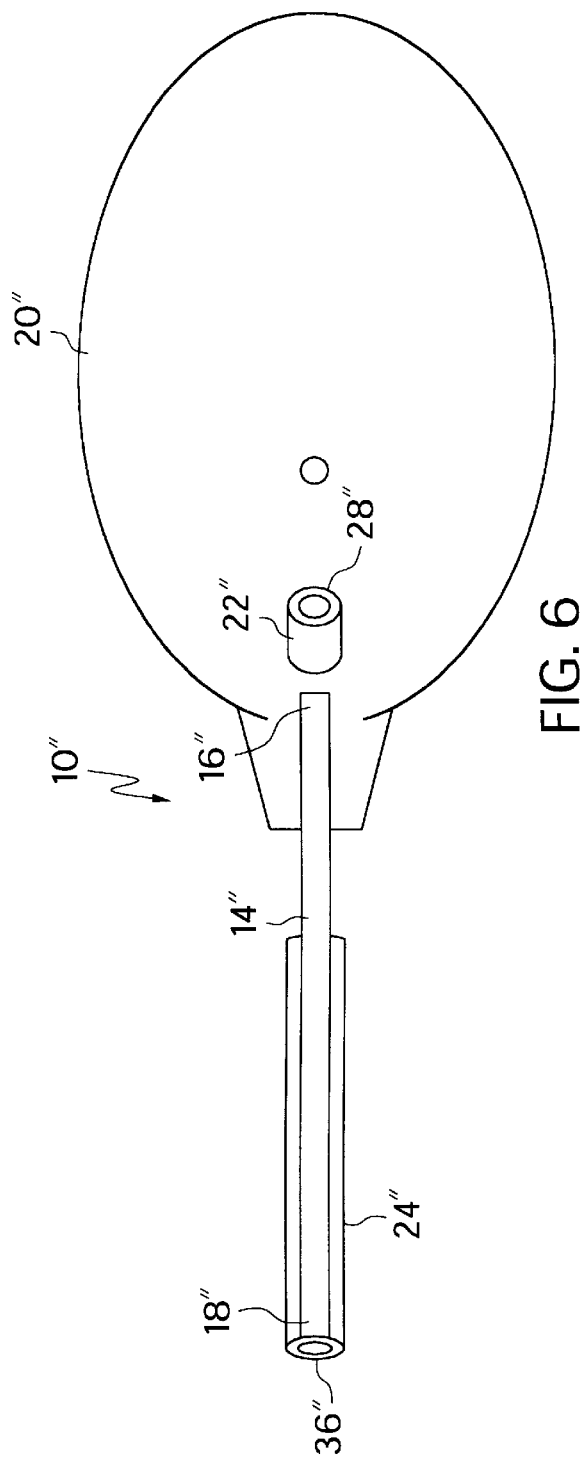

FISHING LURE HARNESS SYSTEM

CROSS-REFERENCE TO RELATED APPLICATIONS

This application claims priority under 35 U.S.C. §119 from Provisional Application Ser. No. 60/032,071, filed Dec. 2, 1996.

BACKGROUND

The present invention relates to fishing lures, and more particularly, a fishing lure harness for molding a soft, fleshy or rubbery lure body thereabout to provide a soft bodied "crank bait" lure.

The artificial fishing lure industry has been dominated for several decades by both crank bait lures and soft bodied lures, i.e., "rubber worms". The fleshy or rubbery material of the soft bodied lures are typically soft, flexible synthetic rubber materials, such as polyvinyl chloride plastisol formulations or silicone rubber formulations. Such soft bodied lures can also incorporate many color schemes and/or scented oils or chemicals which help to simulate the looks and smells of live bait. The industry has yet, however, to manufacture a lure which incorporates all of the action and looks of a crank bait lure with the texture and scents of a soft bodied lure.

Standard crank bait lures utilize a system whereby treble hooks are attached to fixed shanks mounted inside the hard bodied (i.e., hard plastic or wood bodied) lure. A disadvantage with incorporating a similar fixed shank system within a soft bodied lure is that the system would subject the soft body material of the bait to severing and tearing when a fish strikes the lure. First, the weight of the fish, when hooked, will likely tear the fixed shanks from the bait's soft body; and second, even if the shanks hold stead fast to the bait, the mouth and teeth of the fish are likely to cause excessive damage to the soft body of the bait during the ensuing fight.

Accordingly, there is a need for a soft bodied crank bait lure which protects the delicate soft bodied material when a fish is hooked and subsequently reeled in; increasing the life and usefulness of the soft bodied crank bait.

SUMMARY

The present invention provides a soft-bodied crank bait lure comprising a rigid interior harness or skeleton and a fleshy or rubbery body molded or formed over the skeleton, where the skeleton includes: a first channel extending downward and rearward from the anterior end of the lure; and a second channel extending downward and forward from the posterior end of the lure. The rearward opening of the first channel is spaced from and substantially faces the forward opening of the second channel, and the first channel and the second channel are angled with respect to each other. Fishing line or leader line is threaded through the first channel and then through second channel, and the hooks are coupled to the line rather than to the harness or to the rubbery body. Therefore, the lure will "free-flow" on the line, so that when a fish strikes the lure and becomes hooked, the lure will slide away from the fish. Furthermore, during the ensuing fight, when the line becomes taut, the angled alignment between the first and second channels will cause the lure will become substantially "locked" onto the line away from the fish.

Accordingly, it is an object of the present invention to provide a soft-bodied crank bait lure system that substantially prevents the soft-bodied portion of the lure from having to support any of the weight of a hooked fish; and it is an object of the present invention to provide a soft-bodied crank bait lure system that substantially prevents the soft rubber body of the lure from being damaged by the hooked fish during the subsequent fight. These and other objects and advantages of the present invention will be apparent from the following description, the accompanying drawings and the attached claims.

BRIEF DESCRIPTION OF THE DRAWINGS

FIG. 1 is a top plan view of the fishing lure harness or skeleton of the present invention;

FIG. 2 is an elevational, cross-sectional, side view of the present invention taken along lines 2—2 of FIG. 1;

FIG. 3 is an elevational side view of the present invention, incorporating the associated crank bait lure rigging;

FIG. 4 is an elevational, cross-sectional view of a second embodiment of the present invention;

FIG. 5 is an elevational, cross-sectional view of a third embodiment of the present invention; and FIG. 6 is a top plan view of the third embodiment of the present invention.

DETAILED DESCRIPTION

As shown in FIGS. 1, 2 and 3, the present invention is a fishing lure skeleton or harness 10 for molding a soft, fleshy or rubbery lure body 12 thereabout. The fishing lure harness 10 of the present invention comprises a body portion, such as an arcuate spine 14, having an anterior end 16 and a posterior end 18; a planar, plate shaped bill 20 extending horizontally forward from the anterior end 16 of the spine 14; an anterior guide tube 22 extending downward and rearward from the anterior end 16 of the spine 14; and a posterior guide tube 24 extending forward and downward from the posterior end 18 of the spine 14. The anterior guide tube 22 includes a hollow channel 26 extending completely therethrough, along centerline X, having a forward mouth 28 opening forward over the top surface 30 of the bill 20 and in front of the anterior end 16 of the spine, and having a rear mouth 32, opening rearwards below the bill 20. The posterior guide tube 24 also has a channel 34 extending completely therethrough, along centerline Y, having a rear mouth 36, opening rearwards near the posterior end 18 of the spine and a forward mouth 38, opening forward between the anterior and posterior ends of the spine. The centerlines X and Y are preferably positioned along the same vertical plane and preferably meet at point P, between the rear mouth 32 of the anterior guide tube 22 and the forward mouth 38 of the posterior guide tube 24. Additionally, the centerlines X and Y preferably meet at an obtuse angle A with respect to each other, where the angle A has an optimal range of approximately 130° to approximately 160°.

As will be described below, the rear mouth 32 of the anterior guide tube 22 and the forward mouth 38 of the posterior guide tube 24 are preferably horizontally spaced from each other to provide for lure rigging to be positioned between the two mouths. Additionally, the arcuate spine 14, the anterior guide tube 22 and the posterior guide tube 24 are all preferably positioned on the same vertical plane.

The arcuate spine 14, the bill 20, the anterior guide tube 22 and posterior guide tube 24 are all preferably molded together into an integral piece from a hard plastic material which is preferably a polycarbonate such as LEXAN. It is also within the scope of the invention that the harness be constructed of substitute materials such as ABS, nylon, polypropylene, crystal styrene, thermoplastic elastomer, polyvinyl-chloride, liquid silicone, wood and/or rubber. It may also be advantageous to combine a gas such a carbon-dioxide into the harness material in order to bring the harness materials specific gravity to less than 1, providing additional buoyancy to the harness materials.

The bill 20 includes a threaded bore 40 vertically drilled therein for receiving a threaded screw eye 42. Also, a prong 43 extends horizontally rearward from the bill 20. The prong 43 is adapted to secure the soft rubber body 12 of the lure to the harness 10.

The preferred rigging of the harness/lure is best shown in FIG. 3. Fishing line 46 is first threaded into the eyelet opening 48 of the screw eye 42, then into the forward mouth 28 of the anterior guide tube 22, through the channel 26, out through the rear mouth 32 of the anterior guide tube, through a hole of a slip sinker 50, into the eye 52 of a forward hook set 54, then into the forward mouth 48 of the posterior guide tube 24, through the channel 34, out through the rear mouth 36 of the posterior guide tube 24, through a hole in a plastic bead 56, and finally tied to the eyelet 58 of a rearward hook set 60. Because the fishing line 46 is tied only to the rearward hook set 60 no part of the fishing lure needs to be tied to the line, allowing the lure to be free flowing on the line. Furthermore, since the lure is free flowing on the line, when a fish is hooked, the lure will slide up the line away from the fish. Therefore, the soft rubber body 12 of the lure will not be required to support any of the weight of the fish. Additionally, once the hook is set and the line is taut, the angled alignment of the anterior guide tube 22 and the posterior guide tube 24 with respect to each other, will cause the taut fishing line 46 running through the guide tubes to "lock" the lure to the line, thus preventing the lure to slide back down the line toward the fish. This free flowing feature of the harness with respect to the line in combination with the "locking" feature of the guide tubes substantially prevents the soft rubber body of the lure from being damaged by the fish during the subsequent fight.

As can be further seen in FIG. 3, the soft rubber body 12 of the fishing lure is molded onto and over the harness 10, and the body preferably includes a cavity 62 extending into its underside between the rear mouth 32 of the anterior guide tube 22 and the forward mouth 38 of the posterior guide tube 24. This cavity 62 allows for the various lure rigging 50, 54 to be provided between the anterior and exterior guide tubes. It should also be apparent to one of ordinary skill in the art that the line 46 could also be any type of leader, tied ahead of the fishing lure to the fishing line 46. Furthermore, it is also within the scope of the invention to include the eyelet opening 42 and screw eye 48 as integrated into the harness 10.

As shown in FIG. 4, a second embodiment of the harness 10' is substantially the same as the first embodiment (shown in FIGS. 1–3) except that the arcuate spine 14 of the first embodiment is replaced with an inner body segment 14'. Therefore, the harness 10' is a solid piece which includes the appropriate channels, anterior channel 26' and posterior channel 34', with the appropriate mouths, forward mouth 28' and rear mouth 32'of the anterior channel 26' and the forward mouth 38' and rear mouth 36' of the posterior channel 34'. The soft rubber body 12' can thus be poured/injected around this solid harness 10' essentially creating a smaller solid lure inside a larger soft-body lure.

As shown in FIGS. 5 and 6, a third embodiment of the harness 10" comprises an arcuate spine portion 14" having an anterior end 16" and a posterior end 18"; a planar, plate shaped bill 20" extending horizontally forward from the anterior end 16" of the spine 14"; an anterior guide tube 22" adjacent to and extending downward and rearward from the anterior end 16" of the spine 14"; and a posterior guide tube 24" extending forward and downward from the posterior end 18" of the spine 14". The anterior guide tube 22" includes a hollow channel 26" extending completely therethrough, along centerline X', and having a forward mouth 28", opening forward over the top surface 30" of the bill 20" and in front of the anterior end 16" of the spine, and having a rear mouth 32", opening rearwards below the bill 20". The posterior guide tube 24" also has a channel 34" extending completely therethrough, along centerline Y', and having a rear mouth 36", opening rearwards near the posterior end 18" of the spine and a forward mouth 38", opening forward between the anterior and posterior ends of the spine. A rattle attachment 64 is mounted to the underside of the bill 20" and a bobber 66 (for added buoyancy) is mounted to the rear of the bill 20" adjacent the underside of the spine 14".

It should be apparent to one of ordinary skill in the art that, in addition to the advantages discussed above, the present invention (if adequate buoyancy is added to the lure, such as bobber 66) also provides a lure rigging system which is retrievable from snags both above and below the surface of the water. As described in detail in U.S. Pat. No. 4,642,933, incorporated herein by reference, and referring to FIG. 3; in the event that the rearward hook set 60, for example, becomes snagged on a submerged object as the lure is being reeled in, and the line 46 is broken ahead of the lure body, the buoyancy of the lure causes it to float upwardly from the submerged snag. Since the rearward hook set 60 is still lodged in the submerged object, the line 46 pays out first through the channel 26 of the anterior guide tube 22, through the rigging between the guide tubes, and then through the channel 34 in the posterior guide tube 24. Thus the free flowing lure becomes released from the line 46, floats to the surface of the water, and allows the angler to retrieve the lure from the water's surface. It will be apparent to those of ordinary skill in the art that the harness materials or the rubbery body molded thereabout may provide sufficient buoyancy to the lure so as to reduce or eliminate the need for the bobber 66.

Having described the invention in detail and by reference to the drawings, it will be apparent that modification and variations are possible without departing from the scope of the invention as defined in the following claims:

What is claimed is:

1. A fishing lure having an anterior end and a posterior end, said lure comprising:

a rigid interior skeleton and a fleshy or rubbery body molded or formed over said skeleton;

said skeleton including a first channel extending downward and rearward from said anterior end of said lure, said first channel having a forward opening and a rearward opening; and said skeleton including a second channel extending downward and forward from said posterior end of said lure, said channel having a forward opening and a rearward opening;

said rearward opening of said first channel being spaced from and substantially facing said forward opening of said second channel; and said first channel and said second channel being angled with respect to each other;

whereby when a fishing line is first threaded through said first channel and into said second channel, said lure will become substantially locked on said fishing line when said fishing line becomes taut.

2. The fishing lure of claim 1, wherein said first channel and said second channel are angled with respect to each other at an obtuse angle.

3. The fishing lure of claim 2, wherein said obtuse angle is from approximately 130° to approximately 160°.

4. The fishing lure of claim 1, wherein:

said skeleton includes an arcuate spine having an anterior end and a posterior end, an anterior guide tube extending downward and rearward from said anterior end of said spine, and a posterior guide tube extending downward and forward from said posterior end of said spine;

said anterior guide tube includes said first channel; and said posterior guide tube includes said second channel.

5. The fishing lure of claim 4, wherein said skeleton includes a bill extending forward from said anterior end of said spine.

6. The fishing lure of claim 1, wherein said skeleton includes a means for providing buoyancy to the fishing lure.

7. A fishing lure having an anterior end and a posterior end, said lure comprising:

a lure body, including a first channel extending downward and rearward from said anterior end of said lure, said first channel having a forward opening and a rearward opening, and including a second channel extending downward and forward from said posterior end of said lure, said channel having a forward opening and a rearward opening;

said rearward opening of said first channel substantially facing said forward opening of said second channel, such that fishing line can be threaded out from said rearward opening of said first channel and into said forward opening of said second channel; and said first channel and said second channel being positioned along a vertical plane and angled with respect to each other;

whereby when a fishing line is first threaded through said first channel and into said second channel, said lure will become substantially locked on said fishing line when said fishing line becomes taut.

8. The fishing lure of claim 7, wherein said first channel and said second channel are angled with respect to each other at an obtuse angle.

9. The fishing lure of claim 8, wherein said obtuse angle ranges from approximately 130° to approximately 160°.

10. The fishing lure of claim 9, wherein said rearward opening of said first channel is spaced from said forward opening of said second channel.

* * * * *